(12) United States Patent
Ehrmann

(10) Patent No.: US 9,567,124 B2
(45) Date of Patent: Feb. 14, 2017

(54) TOOL CHANGING DEVICE FOR A WORK STATION OF A THERMOFORMING PACKAGING MACHINE

(75) Inventor: Elmar Ehrmann, Bad Groenenbach (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 1273 days.

(21) Appl. No.: 13/468,676

(22) Filed: May 10, 2012

(65) Prior Publication Data
US 2012/0291400 A1 Nov. 22, 2012

(30) Foreign Application Priority Data
May 10, 2011 (DE) .................. 10 2011 101 051

(51) Int. Cl.
| | | |
|---|---|---|
| *B65B 59/04* | (2006.01) | |
| *B65B 9/04* | (2006.01) | |
| *B65B 65/02* | (2006.01) | |
| *B29C 33/30* | (2006.01) | |
| *B29C 33/34* | (2006.01) | |

(52) U.S. Cl.
CPC .............. *B65B 59/04* (2013.01); *B29C 33/305* (2013.01); *B29C 33/34* (2013.01); *B65B 9/04* (2013.01); *B65B 65/02* (2013.01)

(58) Field of Classification Search
CPC ..................... B65B 47/00–47/10; B65B 59/04; B65B 11/52; B65B 9/04; B65B 65/02; B29C 33/30–33/32; B29C 33/34; B30B 15/026; B30B 15/028

USPC ........ 483/28; 53/453, 559, 329.3; 100/229 R
See application file for complete search history.

(56) References Cited

U.S. PATENT DOCUMENTS

| | | | | |
|---|---|---|---|---|
| 3,343,332 A * | 9/1967 | Mahaffy et al. | .......... | B65B 9/04 53/433 |
| 3,397,508 A * | 8/1968 | Stroop | ...................... | B65B 9/04 425/398 |
| 3,474,494 A * | 10/1969 | Damm et al. | ......... | B29C 33/305 264/107 |
| 3,495,526 A * | 2/1970 | Mohler | ................... | B30B 15/16 100/229 R |
| 3,650,411 A | 3/1972 | Reis et al. | | |

(Continued)

FOREIGN PATENT DOCUMENTS

| | | | | |
|---|---|---|---|---|
| DE | 4314550 A1 * | 11/1994 | ............ | B65B 59/04 |
| DE | 10011264 B4 | 9/2001 | | |

(Continued)

OTHER PUBLICATIONS

Extended European Search Report Dated Jul. 6, 2012, Applicant Multivac Sepp Haggenmueller GmbH & Co. KG, Application No. 12002937.6, 5 Pages.

(Continued)

*Primary Examiner* — Stephen F Gerrity
(74) *Attorney, Agent, or Firm* — Husch Blackwell LLP

(57) ABSTRACT

A tool changing device of a work station in a thermoform packaging machine allows a tool insert to be removed from the work station laterally relative to a working direction of material conveyed through the work station. A position of the tool insert is moveable to a position above a chain guide on at least one side to allow the tool insert to be removed from the work station above the chain guide.

16 Claims, 5 Drawing Sheets

(56) References Cited

U.S. PATENT DOCUMENTS

| | | | | |
|---|---|---|---|---|
| 3,744,950 | A * | 7/1973 | Courtois | B29C 33/305 425/186 |
| 3,767,349 | A * | 10/1973 | Jezuit | B65B 9/04 425/289 |
| 4,168,598 | A * | 9/1979 | Omori | B65B 9/04 53/433 |
| 4,282,699 | A * | 8/1981 | Embro, Jr. | B29C 65/305 53/329.3 |
| 4,773,839 | A * | 9/1988 | Case et al. | B29C 33/305 100/214 |
| 5,307,692 | A * | 5/1994 | Kaplan | B30B 15/28 53/453 |
| 5,401,153 | A * | 3/1995 | Katagiri et al. | B30B 15/026 425/193 |
| 5,458,057 | A * | 10/1995 | Arens | B30B 15/028 100/229 R |
| 5,475,965 | A * | 12/1995 | Mondini | B29C 65/02 53/329.3 |
| 5,535,655 | A * | 7/1996 | Kammann | B30B 15/026 83/559 |
| 5,619,913 | A * | 4/1997 | Padovani | B30B 15/028 100/229 R |
| 6,006,505 | A | 12/1999 | Natterer | |
| 6,085,497 | A | 7/2000 | Natterer | |
| 6,200,245 | B1 * | 3/2001 | Dodo | B21B 15/0042 483/28 |
| 2001/0029225 | A1 * | 10/2001 | Kawamoto | B21D 37/14 483/28 |
| 2006/0236656 | A1 * | 10/2006 | Bausch et al. | B65B 59/04 53/167 |
| 2009/0100804 | A1 * | 4/2009 | Bonneville | B65B 59/04 53/453 |
| 2009/0266028 | A1 * | 10/2009 | Zeller et al. | B65B 59/04 53/201 |
| 2010/0287889 | A1 * | 11/2010 | Bonneville | B65B 9/04 53/453 |

FOREIGN PATENT DOCUMENTS

| | | | |
|---|---|---|---|
| DE | 10359478 A1 | 7/2005 | |
| DE | 102007027789 A1 | 12/2008 | |
| DE | 102008032306 A1 | 1/2010 | |
| DE | 102008052598 A1 | 1/2010 | |
| EP | 0467069 A1 | 1/1992 | |
| EP | 0895933 A1 | 2/1999 | |
| EP | 0895934 A1 | 2/1999 | |
| EP | 1598275 A1 * | 11/2005 | B65B 59/04 |
| EP | 1674225 A2 * | 6/2006 | B30B 15/026 |
| EP | 1832405 A2 * | 9/2007 | B29C 33/305 |
| EP | 2241508 A2 * | 10/2010 | B65B 59/04 |
| EP | 2384980 A1 | 11/2011 | |
| WO | WO 2008043572 A1 * | 4/2008 | B65B 9/04 |

OTHER PUBLICATIONS

German Search Report Dated Apr. 11, 2012, Applicant MULTIVAC Sepp Haggenmueller GmbH & Co. KG, Application No. 10 2011 101 051.7, 4 pages.

* cited by examiner

TOOL CHANGING DEVICE FOR A WORK STATION OF A THERMOFORMING PACKAGING MACHINE

CROSS-REFERENCE TO RELATED APPLICATIONS

This application claims foreign priority benefits under 35 U.S.C. §119(a)-(d) to German patent application number DE 10 2011 101 051.7, filed May 10, 2011, which is incorporated by reference in its entirety.

TECHNICAL FIELD

The disclosure relates to a tool changing device of a thermoform packaging machine and a method for changing a tool insert.

BACKGROUND

EP 0 895 934 B1, which is owned by the applicant himself, discloses a work station comprising a lifting unit in the case of which a tool lower part and a tool upper part are moved via a common toggle lever mechanism such that, when the tool lower part is lowered, the tool upper part will be raised, and vice versa. The lifting heights of the tools are different. The disclosure solves the problem arising when products extending beyond the sealing plane are conveyed into the sealing station. When packaging troughs which are to be sealed and which contain products extending beyond the sealing plane are fed-in and when sealed packages are conveyed out of the sealing station, the sealing tool upper part is raised and a collision between the product and the sealing tool upper part is avoided.

EP 0 467 069 A1 discloses a thermoform packaging machine in which a tool lower part can be removed laterally from the thermoform packaging machine below the film web. This is done without influencing the film web.

For exchanging tool upper parts in thermoform packaging machines, said tool upper parts are normally raised and exchanged. Tool inserts which are to be exchanged in tool upper parts, e.g., on forming or sealing stations, and part of which is located between the transport chains and the chain guides, respectively, when the thermoform packaging machine is in operation, are raised as a unit with the tool upper part or are removed from the tool upper parts in the direction of production above the film web and exchanged.

SUMMARY

It is an object of the present disclosure to provide a possibility of laterally exchanging a tool insert of a tool upper part in a thermoform packaging machine.

A tool changing device according to the present disclosure used for a tool insert of a work station of a thermoform packaging machine provides a tool carrier for receiving therein the tool insert, and a chain guide for conveying a web-shaped material through the work station, said tool carrier and said tool insert being adapted to be moved in common to a tool changing position through a movement to at least one side relative to the chain guide. Such a movement removes the tool insert in a simple manner away from the chain guide, so that the interfering contours of the chain guide will not interfere with the tool insert that is laterally removed from the thermoform packaging machine and exchanged.

Preferably, the tool carrier and the tool insert are adapted to be moved, in common, to a tool changing and a working position by means of a pivoting device, the pivot axis being provided on a side of a first chain guide and the common movement of the tool carrier and of the tool insert being provided on a side of a second chain guide.

Alternatively, it will be advantageous when the tool carrier and the tool insert are adapted to be vertically moved, in common, to a tool changing position and a working position by means of a lifting unit. Such a movement raises the tool insert to a position above the chain guide such that the tool insert can be removed laterally from the packaging machine across the chain guide without being impeded.

According to a preferred embodiment, the work station is a forming station or a sealing station.

Preferably, the tool insert is a heating plate in the case of a forming station or a sealing plate in the case of a sealing station.

According to a particularly advantageous embodiment, the tool insert, configured e.g., as a heating plate in a forming station, is in large-area contact with a cooling plate of the forming station when the thermoform packaging machine is in operation, so that a tool insert configured as a heating plate will be cooled permanently. The cooling circuit is provided in the tool carrier, which is fixedly attached to the machine frame, and in the cooling plate of the forming station, respectively, and a discharge of the cooling water prior to the removal of the tool insert can be dispensed with, whereby the tool changing time will be reduced.

Preferably, a thermoform packaging machine is provided with a tool changing device according to the present disclosure so as to facilitate an exchange of a tool insert and reduce the time required therefor.

A method provided according to the present disclosure for operating a tool changing device of a work station in a thermoform packaging machine so as to exchange a tool insert laterally relative to a production or working direction is so conceived that a tool carrier accommodating the tool insert and the tool insert are vertically raised, in common, above a chain guide used for conveying a web-shaped material through the work station, to a tool changing position. This allows a simple and rapid exchange of the tool insert by removing it laterally from the thermoform packaging machine, without any necessity of taking into account particularly high space requirements above the work station. Supply belts are often located directly above the forming station so as to automatically feed e.g., portions of sliced products, such as sausage or cheese, into formed packaging troughs. When the method according to the present disclosure is used, these supply belts need no longer be removed for allowing an exchange of a tool insert at a forming station.

According to a preferred embodiment, the common movement of the tool carrier and the tool insert to the tool changing position takes place simultaneously with or after opening of the work station, the method being so conceived that, during opening of the work station, a tool, which is positioned on the side of the web-shaped material facing away from a product, is moved relative to and away from the tool insert, which is positioned on the side of the web-shaped material facing a product.

Preferably, the movement of the tool carrier and the tool insert to the tool changing position takes place before or simultaneously with the closing of the work station, the method being so conceived that, during closing of the work station, a tool, which is positioned on the side of the web-shaped material facing away from a product, is moved relative to and towards the tool insert, which is positioned on the side of the web-shaped material facing a product.

The common movement of the tool carrier and the tool insert is preferably executed by means of a lifting unit, so as to utilize an already existing drive of the work station, or by means of a separate actuator, so as to carry out the respective movement independently of the movements taking place in the work station.

The common movement of the tool carrier and the tool insert preferably takes place while the web-shaped material is standing still or does not take part in the production process.

According to a preferred embodiment, the tool insert is cooled by means of a cooling plate of the forming station in that the tool insert and the cooling plate of the forming station are in large-area contact and active cooling by means of a cooling circuit is only provided in the non-movable cooling plate. It is neither necessary to separate the tool insert from the cooling water supply and the cooling water drain nor is it necessary to discharge the water from the interior of the tool insert. Tool changing is simplified still further in this way.

According to a preferred embodiment, the tool insert is, by means of a control unit, automatically unlocked for removal from the work station and/or automatically locked after having been inserted in the work station. The exact and repeatable position of the tool insert in the work station is thus guaranteed, and, in combination with an optional sensor system, machine start can be allowed or inhibited as required.

It will be expedient when power lines between the tool insert and the tool carrier are, by means of connection elements, automatically disconnected when the tool insert is being pulled out, and automatically connected when the tool insert is being pushed in. Manual operations for disconnecting or unplugging the individual line connections are therefore not necessary and the tool changing time is reduced.

In the following, an advantageous embodiment of the disclosure will be explained in more detail with reference to the below drawings.

DETAILED DESCRIPTION

Figure 1:
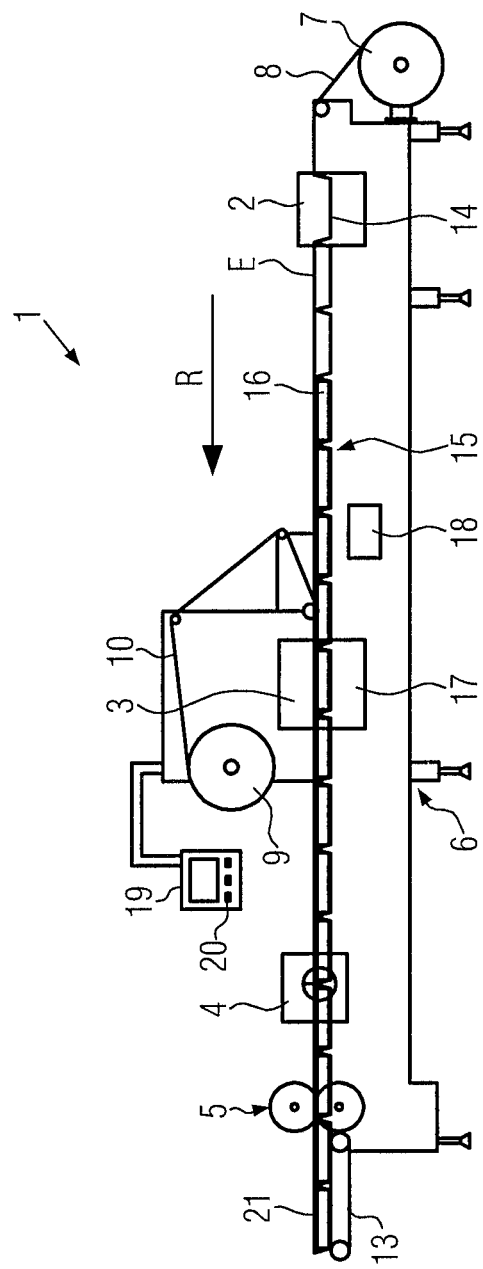
FIG. 1 is a perspective view of a thermoform packaging machine.

Identical components are designated by identical reference numerals throughout the figures.

FIG. 1 shows, in a perspective view, a thermoform packaging machine 1 comprising a forming station 2, a sealing station 3, a cross cutting station 4 and a longitudinal cutting station 5, which are arranged on a machine frame 6 in a working direction R in this sequence. On the input side, a supply roll 7 is provided on the machine frame 6, from which a first web-shaped material 8 is unwound. In the area of the sealing station 3, a material storage unit 9 is provided, from which a second web material 10, e.g., a cover film, is unwound. On the output side, a discharge device 13 in the form of a transport conveyor is provided at the thermoform packaging machine 1, with which finished, singulated packages 21 are transported away. Furthermore, the packaging machine 1 comprises a feeding device, which is not shown, said feeding device gripping the first web-shaped material 8 and transporting it cyclically in a main work cycle in the working direction R. The feeding device can, for example, be realized by laterally arranged transport chains.

In the embodiment shown, the forming station 2 is realized as a thermoforming station in which package lower parts 14 are formed in the first web-shaped material 8 by thermoforming. The forming station 2 can be configured such that in the direction perpendicular to the working direction R several package lower parts 14 are formed side by side. In the working direction R behind the forming station 2, an infeed line 15 is provided, in which the package lower parts 14 formed in the first web-shaped material 8 are filled with the product 16.

The sealing station 3 is provided with a closable chamber 17 in which the atmosphere in the package lower parts 14 can be substituted, prior to sealing the package lower parts 14 with the second web material, by an exchange gas or by an exchange gas mixture, e.g., by gas flushing.

The cross cutting unit 4 is configured as a punch separating the first web-shaped material 8 and the second web material 10 in a direction transversely to the working direction R between neighbouring package lower parts 14. In so doing, the cross cutting unit 4 works such that the first web-shaped material 8 is not cut across the whole width of the web, but remains uncut in at least an edge area thereof. This allows controlled further transport by the feeding device.

In the embodiment shown, the longitudinal cutting unit 5 is configured as a blade arrangement by means of which the first web-shaped material 8 and the second web material 10 are cut between neighbouring package lower parts 14 and at the lateral edge of the first web-shaped material 8, so that, downstream of the longitudinal cutting unit 5, singulated packages 21 are obtained.

The packaging machine 1 is additionally provided with a controller 18. This controller 18 is used for controlling and monitoring the processes taking place in the packaging machine 1. A display device 19 with operating controls 20 serves to make the sequences of process steps in the packaging machine 1 visible to an operator and to influence them by the operator.

Figure 2:
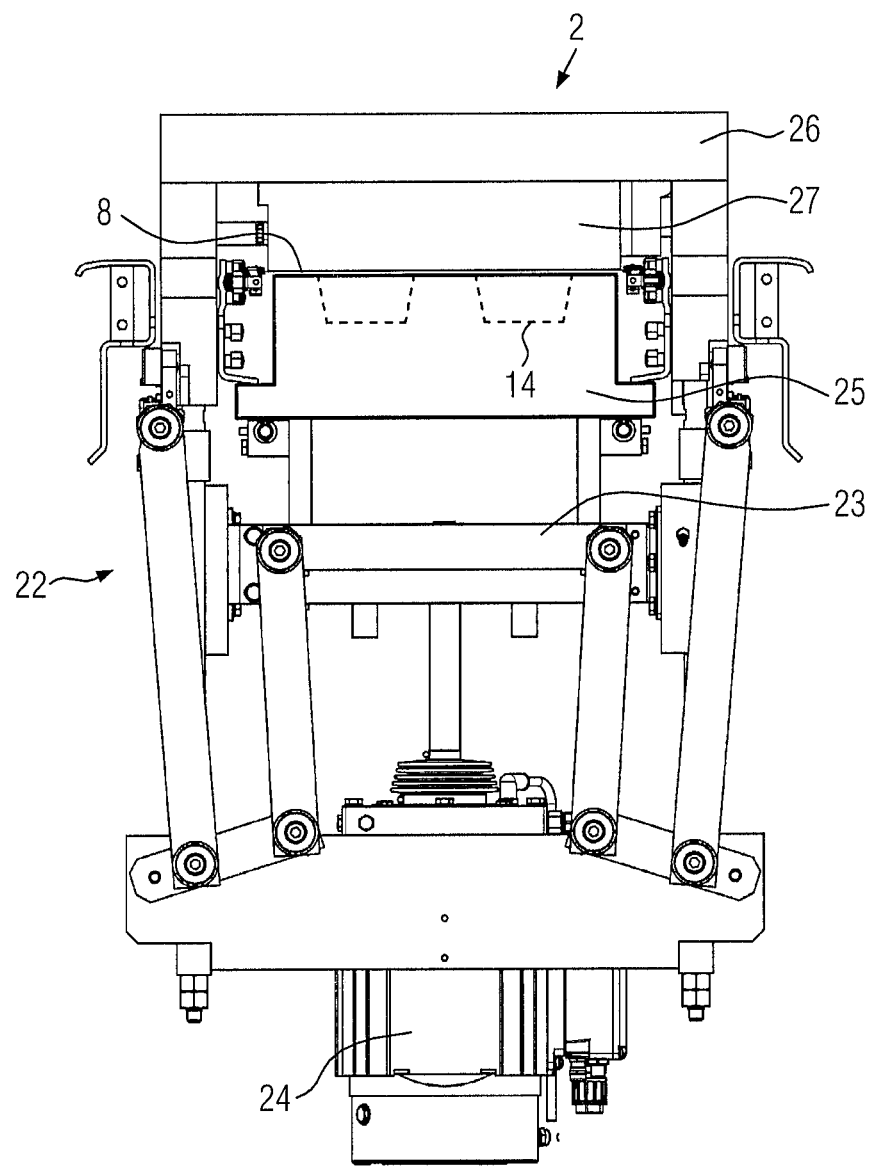
FIG. 2 is a sectional view through a forming station of the packaging machine in a production direction with a tool changing device according to the present disclosure at a closed position.

FIG. 2 shows a tool changing device 22 of the forming station 2, as disclosed by the present disclosure. A lifting unit 23, which is driven by a motor 24, moves a forming tool lower part 25 below the first web-shaped material 8 on the one hand, and, on the other hand, said lifting unit 23 moves a tool carrier 26 and a forming tool upper part, respectively, together with a tool insert 27 inserted therein, above the first web-shaped material 8. In the closed position shown, the forming station 2 is at its operating position. The tool insert 27 is configured as a heating plate, and the lower surface of the heating plate 27 is in large-area contact with the first web-shaped material 8 so as to heat said material 8. The upper surface of the forming tool lower part 25 is in contact with the first web-shaped material 8, and the material 8 is clamped between the forming tool lower part 25 and the heating plate 27 on all sides thereof such that a vacuum can be generated in the interior of the forming tool lower part 25, so as to deform the heated material 8 downwards towards the package lower parts 14.

Figure 3:
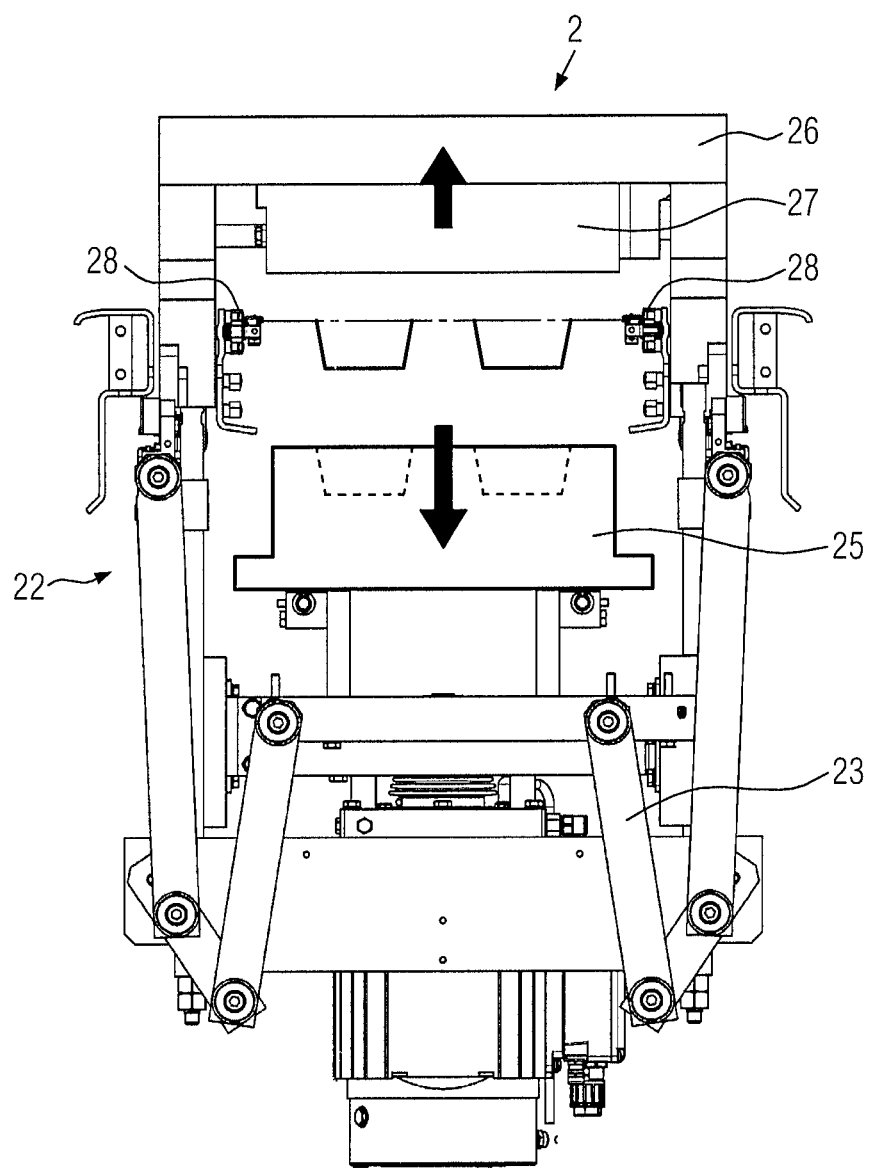
FIG. 3 is a sectional view through the forming station in the production direction at an open position.

In FIG. 3 the forming station 2 is at the tool changing position. The lifting unit 23 has lowered the forming tool lower part 25 and raised the forming tool upper part 26 and the tool insert 27 to such an extent that the lower surface of the tool insert 27 is located above the upper interference contour of lateral chain guides 28.

Figure 4:
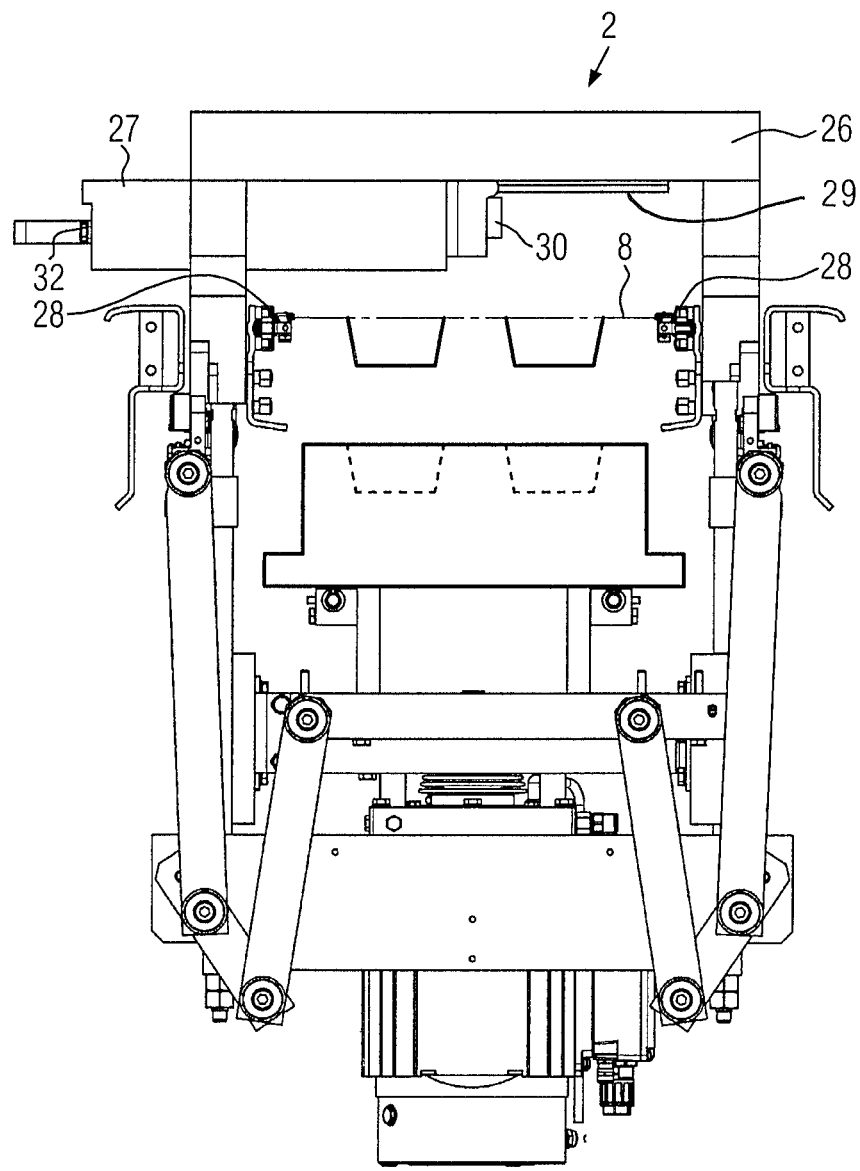
FIG. 4 is a sectional view like FIG. 3, with a tool insert moved out to the side.

As can be seen in FIG. 4, the tool insert can be removed laterally below the tool carrier 26 and above the chain guides 28 at this tool exchange position. Guide units 29 hold the tool insert 27 on the tool carrier 26 until the tool insert 27 can be transferred to the hands of an operator.

Insertion of a new tool insert 27 takes place analogously in reverse order. The work carrier 26 may e.g., be implemented as a cooling plate comprising a water circuit, which is not shown. In this case, the lower surface of the cooling plate 26 is positioned on plane 31 in large-area contact with the heating plate 27. Connection and/or fixing elements 30, which are adapted to be connected to the tool carrier 26, are provided on the right-hand stop side of the heating plate 27, said connection and/or fixing elements 30 being used for the purpose of fixing and for connecting electrical systems, e.g., for controlling heating rods in the heating plate 27 for heating the first web-shaped material 8, and sensor systems, e.g., for evaluating temperature sensors in the heating plate 27. The connection elements for the power supply units are implemented as plug connections which are automatically disconnected when the tool insert 27 is being pulled out and automatically connected when the tool insert 27 is being pushed in. Via a clamping device 32, the tool insert 27 is secured in position on the tool carrier 26 at its inserted working position.

Figure 5:
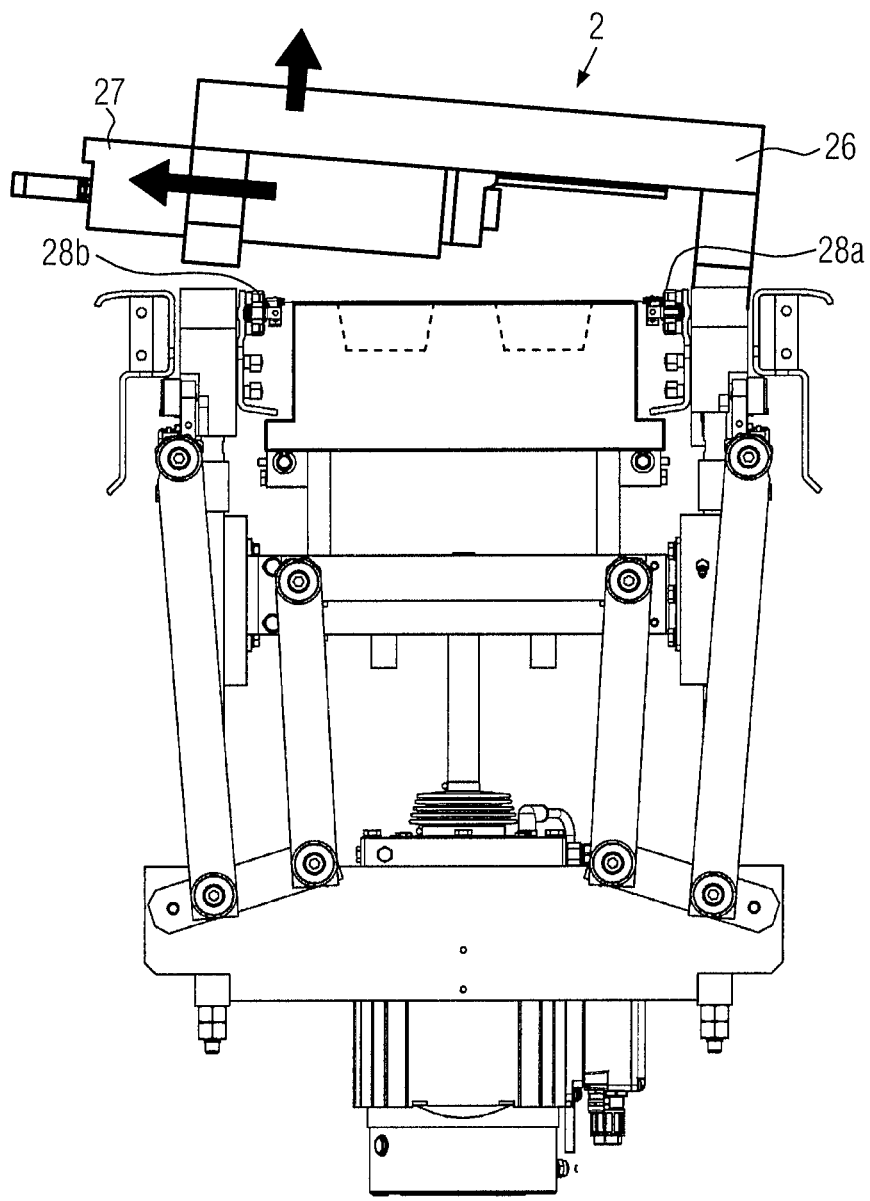
FIG. 5 is a variant of the changing device according to the present disclosure.

FIG. 5 shows an alternative tool changing device 22 according to the present disclosure. FIG. 5 illustrates chain guides 28 as chain guides 28*a* and 28*b*, respectively. In the case of this tool changing device 22, the tool carrier 26 is, together with the tool insert 27, pivoted about an axis oriented in the working direction R such that the tool insert 27 can be removed outwards above the chain guide 28*b*.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tool changing device for a work station of a thermoform packaging machine having a chain guide for conveying a web-shaped material through the work station in a working direction, the tool changing device comprising:
   a tool insert; and
   a tool carrier for receiving the tool insert;
   wherein the tool carrier and the tool insert are adapted to be moved, in common, to a tool changing position through an upward movement to a position that is higher than the chain guide to allow the tool insert to be removed from the work station at least substantially transversely to the working direction and above the chain guide; and
   wherein said tool carrier further comprises one or more guide units extending transversely to the working direction, said one or more guide units for holding the tool insert proximate a bottom surface of said tool carrier and guiding the movement of the tool insert while the tool insert is moved laterally relative to the tool carrier and transferred to an operator.

2. A tool changing device according to claim 1 wherein the tool carrier and the tool insert are pivotable in common between the tool changing position and a working position, wherein the packaging machine further includes an additional chain guide for conveying the web-shaped material, and wherein a pivot axis is positioned proximate a side of the chain guide, and the tool carrier and the tool insert are configured to move in common on a side of the additional chain guide.

3. A tool changing device according to claim 1, further comprising a lifting unit for vertically moving the tool carrier and the tool insert, in common, between the tool changing position and a working position.

4. A tool changing device according to claim 1 wherein the work station is a forming station or a sealing station.

5. A tool changing device according to claim 1 wherein the tool insert comprises a heating plate or a sealing plate.

6. A tool changing device according to claim 1 wherein the work station is a forming station, and the tool insert is configured to be in large-area contact with a cooling plate of the forming station when the thermoform packaging machine is in operation.

7. The tool changing device of claim 1, wherein the one or more guide units are each a guide rail.

8. A thermoform packaging machine comprising a tool changing device according to claim 1.

9. A method of operating a tool changing device of a work station of a thermoform packaging machine for exchanging a tool insert, the method comprising:
   holding the tool insert on the tool carrier with one or more guide units until the tool insert is transferred;
   vertically moving the tool insert and a tool carrier accommodating the tool insert, in common, with a lifting unit above a chain guide used for conveying a web-shaped material through the work station, to a tool changing position;
   moving the tool insert laterally relative to the tool carrier on the one or more guide units, said guide units extending in a direction that is substantially transverse to a working direction of the packaging machine, and said tool insert being moved laterally in the direction that is substantially transverse to the working direction until the tool insert is transferred to an operator;
   guiding the movement of the tool insert on the tool carrier with the one or more guide units as the tool insert moves laterally relative to the tool carrier and until the tool insert is transferred to an operator; and
   holding the tool insert on the tool carrier with the one or more guide units as the tool insert moves laterally relative to the tool carrier and until the tool insert is transferred to an operator.

10. A packaging machine comprising:
    a work station;
    a chain guide for conveying a web-shaped material through the work station in a working direction;
    a tool changing device associated with the work station and including a tool insert and a tool carrier for receiving the tool insert, wherein the tool carrier and the tool insert are adapted to be moved together and with respect to the chain guide to a tool changing position, to allow the tool insert to be removed from the work station laterally relative to the working direction and above the chain guide; and wherein said tool changing device further comprises at least one guide unit extending in a direction substantially transverse to the working direction and disposed on a bottom surface of the tool carrier to hold the tool insert on the tool carrier proximate a bottom surface of the tool carrier and guiding the movement of the tool insert as the tool insert is moved laterally relative to the tool carrier.

11. The packaging machine tool of claim 10 wherein the tool carrier and the tool insert are pivotable between a working position and the tool changing position about a pivot axis disposed proximate an outboard side of the chain guide.

12. The packaging machine of claim 10 wherein the tool changing device further includes a lifting unit for vertically moving the tool carrier and the tool insert, in common, to the tool changing position.

13. The packaging machine tool of claim 10, wherein the at least one guide unit is a guide rail.

14. A packaging machine comprising:
a work station;
a chain guide for conveying a web-shaped material through the work station in a working direction;
a lifting unit operably connected to a tool lower part and a tool upper part, the lifting unit for simultaneously moving a tool lower part and a tool upper part between an operating position, and a tool changing position, wherein said tool changing position locates the entirety of said tool upper part above said chain guide;
the tool upper part and the tool lower part closeable to clamp said web-shaped material and form a vacuum seal;
the tool upper part comprising a tool insert and a tool carrier for receiving the tool insert;
at least one guide unit disposed on the bottom surface of the tool carrier for holding the tool insert on the tool carrier, said at least one guide unit extending in a direction substantially transverse to the working direction and wherein at the tool changing position, the at least one guide unit holds the tool insert against the bottom surface of the tool carrier and guides the movement of the tool insert while the tool insert is moved laterally relative to the tool carrier in the direction substantially transverse to the working direction.

15. The packaging machine tool of claim 14, wherein the tool insert is a heating plate and the tool carrier is a cooling plate, and wherein said heating plate is in thermal contact with a large-area of the bottom surface of the cooling plate when said tool insert is held on the tool carrier.

16. The packaging machine tool of claim 14, wherein the tool insert comprises at least one connecting element which automatically connects to the workstation when said tool insert is pushed in to the tool carrier and automatically disconnects when said tool insert is pulled out of said tool carrier.

* * * * *